US009158935B2

(12) United States Patent
Livshits et al.

(10) Patent No.: US 9,158,935 B2
(45) Date of Patent: Oct. 13, 2015

(54) AUTOMATIC MEDIATION OF RESOURCE ACCESS IN MOBILE APPLICATIONS

(71) Applicant: Microsoft Corporation, Redmond, WA (US)

(72) Inventors: Benjamin Livshits, Kirkland, WA (US); Jaeyeon Jung, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 13/913,341

(22) Filed: Jun. 7, 2013

(65) Prior Publication Data

US 2014/0366147 A1    Dec. 11, 2014

(51) Int. Cl.
*G06F 21/62* (2013.01)
*G06F 9/44* (2006.01)
*G06F 21/60* (2013.01)

(52) U.S. Cl.
CPC ............... *G06F 21/629* (2013.01); *G06F 8/30* (2013.01); *G06F 8/75* (2013.01); *G06F 21/60* (2013.01)

(58) Field of Classification Search
CPC .. G06F 11/3604; G06F 11/3608; G06F 8/433
USPC .............. 714/34, 35, 37–39; 717/126; 726/26
See application file for complete search history.

(56) References Cited

U.S. PATENT DOCUMENTS

| 7,076,804 | B2 * | 7/2006 | Kershenbaum et al. | 726/30 |
| 7,237,236 | B2 * | 6/2007 | Kershenbaum et al. | 717/154 |
| 8,332,936 | B1 | 12/2012 | Hackborn et al. | |
| 2004/0040017 | A1 | 2/2004 | Kershenbaum et al. | |
| 2005/0229165 | A1 * | 10/2005 | Ma et al. | 717/130 |
| 2007/0074169 | A1 * | 3/2007 | Chess et al. | 717/126 |
| 2007/0074188 | A1 * | 3/2007 | Huang et al. | 717/141 |
| 2007/0107057 | A1 * | 5/2007 | Chander et al. | 726/22 |
| 2010/0192194 | A1 * | 7/2010 | Tan et al. | 726/1 |
| 2011/0197180 | A1 * | 8/2011 | Huang et al. | 717/126 |
| 2013/0036448 | A1 * | 2/2013 | Aciicmez et al. | 726/1 |
| 2013/0046778 | A1 | 2/2013 | Higgins et al. | |

FOREIGN PATENT DOCUMENTS

WO    WO 2014059933 A1 *    4/2014    ............. G06F 21/56

OTHER PUBLICATIONS

Briggs, Preston; Cooper, Keith D.; Harvey, Timothy J.; and Simpson, L. Taylor (1998). "Practical Improvements to the Construction and Destruction of Static Single Assignment Form".*
Clint Gibler, Jonathan Crussell, Jeremy Erickson, Hao Chen, "AndroidLeaks: Automatically Detecting Potential Privacy Leaks in Android Applications on a Large Scale", Trust and Trustworthy Computing, Lecture Notes in Computer Science, vol. 7344, 2012, pp. 291-307.*

(Continued)

*Primary Examiner* — Jason K. Gee
*Assistant Examiner* — Zhimei Zhu
(74) *Attorney, Agent, or Firm* — Julie Kane Akhter; Danielle Johnston-Holmes; Micky Minhas (57) ABSTRACT

The subject disclosure is directed towards automated, static analysis-based program code processing that detects unprotected resource accesses by applications, that is, those that do not provide proper opt-in consent dialogs (prompts). In one aspect, consent prompt code is automatically inserted into the program code to protect such unprotected access points. Also described are program representation graph construction and processing, a dominator node-based approach to determine placement points for inserting consent prompt code, and a backward search-based approach for inserting consent prompt code.

20 Claims, 6 Drawing Sheets

(56) References Cited

OTHER PUBLICATIONS

M. Grace, Y. Zhou, Z. Wang, and X. Jiang, "Systematic Detection of Capability Leaks in Stock Android Smartphones," in Proceedings of the 19th Annual Symposium on Network and Distributed System Security, 2012.*

Erika Chin, Adrienne Porter Felt, Kate Greenwood, and David Wagner. 2011. "Analyzing inter-application communication in Android". In Proceedings of the 9th international conference on Mobile systems, applications, and services (MobiSys '11). ACM, New York, NY, USA, 239-252.*

Batyuk, L.; Herpich, M.; Camtepe, S.A.; Raddatz, K.; Schmidt, A.-D.; Albayrak, S., "Using static analysis for automatic assessment and mitigation of unwanted and malicious activities within Android applications," Malicious and Unwanted Software (MALWARE), 2011 6th International Conference on, vol., No., pp. 66,72, Oct. 18-19, 2011.*

Egele, et al., "PiOS: Detecting Privacy Leaks in iOS Applications", In Proceedings of the 18th Annual Network & Distributed System Security Symposium, Feb. 2011, 15 pages.

Pielot, et al., "Experiments in App Stores—How to Ask Users for their Consent?", In Proceedings of Workshop on Ethics, Logs & Videotape, May 7, 2011, 4 pages.

Elish, et al., "A Static Assurance Analysis of Android Applications", Retrieved on: Mar. 8, 2013, 15 pages. Available at: http://people.cs.vt.edu/~danfeng/papers/user-intention-PA-2013.pdf.

Das, et al., "PRISM: Platform for Remote Sensing using Smartphones", In Proceedings of the 8th International Conference on Mobile Systems, Applications, and Services, Jun. 15, 2010, 14 pages.

Enck, William, "Defending Users Against Smartphone Apps: Techniques and Future Directions", In Proceedings of the 7th International Conference on Information Systems Security, Dec. 15, 2011, 22 pages.

Felt, et al., "The Effectiveness of Application Permissions", In 2nd USENIX Conference on Web Application Development, Jun. 15, 2011, 12 pages.

King, Jennifer, ""How Come I'm Allowing Strangers To Go Through My Phone?"—Smartphones and Privacy Expectations", Retrieved on: Mar. 7, 2013, 10 pages. Available at: http://www.jenking.net/mobile/jenking_smartphone_DRAFT.pdf.

"Microsoft Sued for Location Tracking by Windows Phone 7", Published on: Aug. 31, 2011, 9 pages. Available at: http://www.electronista.com/articles/11/08/31/microsoft.accused.of.ignoring.wp7.location.info/.

"Pandora Discloses Privacy-Related U.S. Inquiry Into Phone Apps", Published on: Apr. 4, 2011, 3 pages. Available at: http://www.nytimes.com/2011/04/05/technology/05pandora.html?_r=0.

"Daily Report: Social App Makes Off With Address Books", Published on: Feb. 8, 2012, 5 pages. Available at: http://bits.blogs.nytimes.com/2012/02/08/daily-report-social-app-makes-off-with-address-books/.

Panzarino, Matthew, "LinkedIn's iOS App Collects and Transmits Names, Emails and Notes From Your Calendar, In Plain Text", Published on: Jun. 6, 2012, 7 pages. Available at: http://thenextweb.com/insider/2012/06/06/linkedins-ios-app-collects-and-sends-names-emails-and-meeting-notes-from-your-calendar-back-in-plain-text/.

Holier, Mike, "Path Mobile App Privacy Class Action Lawsuit", Published on: Mar. 29, 2012, 4 pages. Available at: http://www.topclassactions.com/lawsuit-settlements/lawsuit-news/1728-path-mobile-app-privacy-class-action-lawsuit.

"App Policies for Windows Phone", Published on: Mar. 6, 2013, 7 pages. Available at: http://msdn.microsoft.com/en-us/library/windowsphone/develop/hh184841(v=vs.105).aspx.

"FTC Staff Report Recommends Ways to Improve Mobile Privacy Disclosures", Published on: Feb. 1, 2013, 3 pages. Available at: http://www.ftc.gov/opa/2013/02/mobileprivacy.shtm.

Bohme, et al., "Trained to Accept? A Field Experiment on Consent Dialogs" In Proceedings of the SIGCHI Conference on Human Factors in Computing Systems, Apr. 10, 2010, 4 pages.

Felt, et al., "How to Ask for Permission", In Proceeding of the 7th USENIX Workshop on Hot Topics in Security, Aug. 7, 2012, 6 pages.

Felt, et al., "Android Permissions: User Attention, Comprehension, and Behavior", In Proceeding of Symposium on Usable Privacy and Security, Jul. 11, 2012, 14 pages.

Fisher, et al., "Short Paper: Location Privacy: User Behavior in the Field", In Proceedings of the Second ACM Workshop on Security and Privacy in Smartphones and Mobile Devices, Oct. 19, 2012, 6 pages.

Hammer, et al., "Intransitive Noninterference in Dependence Graphs", In Proceeding of Second International Symposium on Leveraging Applications of Formal Methods, Verification and Validation, Nov. 15, 2006, 10 pages.

Hammer, et al., "Information Flow Control for Java Based on Path Conditions in Dependence Graphs", In Proceedings of In Proceedings IEEE International Symposium on Secure Software Engineering, Mar. 2006, 10 pages.

Hammer, et al., "Flow-Sensitive, Context-Sensitive, and Object-sensitive Information Flow Control Based on Program Dependence Graphs", In International Journal of Information Security, vol. 8, Issue 6, Dec. 2009, 22 pages.

Boyles, et al., "Privacy and Data Management on Mobile Devices", Published on: Sep. 5, 2012, 1 page. Available at: http://pewinternet.org/~/media//Files/Reports/2012/PIP_MobilePrivacyManagement.pdf.

Jung, et al., "Short Paper: Enhancing Mobile Application Permissions with Runtime Feedback and Constraints", In Proceedings of the Second ACM Workshop on Security and Privacy in Smartphones and Mobile Devices, Oct. 9, 2012, 6 pages.

Felt, et al., "Android Permissions: User Attention, Comprehension, and Behavior", In Proceedings of the Eighth Symposium on Usable Privacy and Security, Article No. 3, Jul. 11, 2012, 14 pages.

Lin, et al., "Expectation and Purpose: Understanding Users' Mental Models of Mobile App Privacy Through Crowdsourcing", In Proceeding of 14th International Conference on Ubiquitous Computing, Sep. 5, 2012, 10 pages.

Livshits, et al., "Towards Fully Automatic Placement of Security Sanitizers and Declassifiers", In Proceedings of the 40th Annual ACM SIGPLAN-SIGACT Symposium on Principles of Programming Languages, Jan. 23, 2013, 14 pages.

Robertson, et al., "Static Enforcement of Web Application Integrity Through Strong Typing", In Proceedings of the 20th Conference on USENIX Security Symposium, Aug. 8, 2011, 15 pages.

Sabelfeld, et al., "Dimensions and Principles of Declassification" In Proceedings of the 18th IEEE Workshop Computer Security Foundations, Jun. 20, 2005, 15 pages.

Samuel, et al., "Context-Sensitive Auto-Sanitization in Web Templating Languages Using Type Qualifiers", In Proceedings of the 18th ACM Conference on Computer and Communications Security, Oct. 17, 2011, 14 pages.

Scholz, et al., "User-Input Dependence Analysis via Graph Reachability", In Technical Report (SMLI TR-2008-171), Sep. 28, 2008, 30 pages.

Weinberger, et al., "A Systematic Analysis of XSS Sanitization in Web Application Frameworks", In Proceedings of the European Symposium on Research in Computer Security, Sep. 12, 2011, 22 pages.

PCT Search Report, PCT/US2014/039610, Filed date May 27, 2014, Mailing date Sep. 4, 2014, 14 pages.

Livshits, et al., "Automatic Mediation of Privacy-Sensitive Resource Access in Smartphone Applications", In Proceedings of the 22nd USENIX Security Symposium, Aug. 14-16, 2013, Retrieved from http://0b4af6cdc2f0c5998459-c0245c5c937c5dedcca3f1764ecc9b2f.r43.cf2.rackcdn.com/12299-sec13-paper_livshits.pdf, 18 pages.

Gilbert, et al., "Automating Privacy Testing of Smartphone Applications", Jan. 1, 2011, 5 pages.

"International Preliminary Report on Patentability Issued in PCT Patent Application No. PCT/US2014/039610", Mailed Date: Jun. 16, 2015, 10 Pages.

* cited by examiner

AUTOMATIC MEDIATION OF RESOURCE ACCESS IN MOBILE APPLICATIONS

BACKGROUND

Runtime consent dialogs (sometimes referred to as runtime permission prompts) are commonly used by mobile applications to obtain a user's explicit consent prior to accessing privacy-sensitive data, such as location (GPS) data, contact lists/address books, photographs, calendar data, phone number and so forth. Because of privacy concerns, before an application accesses user's privacy-sensitive data on a phone or similar device, the application is supposed to provide such consent dialogs to obtain opt-in consent from the user as part of complying with policy.

However, in practice many applications fail to do so; indeed studies have shown that the majority of applications have at least one missing opt-in consent prompt. Two types of violations exist in applications, namely not asking for opt-in consent when supposed to, and asking for consent but ignoring the answer when the user chooses to not opt in. These violations result in potentially serious privacy violations.

Properly placing an opt-in consent dialog is relatively difficult, as applications tend to have complicated control flows. The control flows often span across third party libraries that come as a "black box" or the like, which are out of the developer's control, whereby even careful application developers are susceptible to violations when such third party libraries are used; notwithstanding, such use of third party libraries is commonplace. For example, advertising libraries tend to access location data without providing the consent dialog.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards automatically processing application program code to locate one or more places in the code that do not comply with consent prompting policy. This includes statically analyzing the application program code to determine where sensitive resource data is able to be accessed during runtime without a prior consent prompt. The automatic processing may determine a valid place in the application program code to insert prompting code corresponding to a consent prompt, and insert the prompting code to prevent the sensitive resource data from being accessed during runtime without a user's consent.

In one aspect, a program representation graph construction component is configured to construct a program representation graph (a graph that may incorporate a call graph as well as representing intraprocedural logic) representing calls in application program code. A program representation graph processing component processes the program representation graph to determine whether the application fails to provide a runtime consent dialog prior to a potential runtime access of a privacy-sensitive resource. One or more placement components determine one or more placement points to insert prompting code corresponding to a consent dialog into the application code if the application program code fails to provide a runtime consent dialog prior to the potential runtime access of privacy-sensitive resource.

One or more aspects are directed towards constructing a program representation graph to represent at least part of program code and a dominator tree corresponding to the program representation graph, and analyzing the program code in a static analysis operation by processing the program representation graph to determine whether access to one or more sensitive resources are protected by a consent dialog at each potential access point, and if so, ending the analysis operation. For each potential access point that is not protected, a dominator-based strategy is attempted to determine whether consent dialog code is able to be inserted into the program code at a place corresponding to an anticipating node that protects the potential access point. For each potential access point that is not protected, and where the dominator-based strategy is unable to insert a consent dialog into the program code, a backward search strategy is performed based upon the program representation graph to find one or more places in the program code where consent dialog code is able to be inserted to protect the potential access point.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automated, static analysis-based solutions that detect unprotected resource accesses by applications and insert missing opt-in consent dialogs/prompts. This may include analyzing third-party libraries, which have been found to be often responsible for accessing privacy-sensitive resources without prior user consent or even accessing resources against the user's choice to not allow access.

In one implementation, a graph-theoretic algorithm is used to place mediation prompts that protect resource access, while avoiding repetitive prompting and prompting in background tasks or third-party libraries. In one aspect, a two-pronged static analysis algorithm is used for correct resource access prompt placement. The algorithm first attempts to use a fast, dominator-based placement technique, (where dominators are known concepts in graph theory). If the dominator-based placement technique fails, a slower, more exhaustive backward search is performed.

As described herein, a scalable static analysis algorithm automatically finds places for inserting prompts when they are missing. Note that while it is feasible to use dynamic analysis to observe missing prompts at runtime, static solutions avoid a number of runtime challenges. The static analysis algorithm scales well with application size and does not require any changes to the underlying operating system. Although false positives are possible, given the complexity of some of the applications and execution environment, occasional double-prompts may occur, however the downside of such an extra prompt is considerably less than the downside of the safety violations in the current error-prone practice.

As will be understood, the technology described herein is only one solution to the challenge of automatic and correct prompt insertion, and although in practice the technology has been proven to work well, it should be considered a practical, viable example and not as limiting in any way. Indeed, it should be understood that any of the algorithms, code, examples and/or descriptions herein are non-limiting. For instance, while privacy-related prompts are exemplified herein, the insertion of other missing prompts (e.g., related to security warnings) may likewise benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and application coding in general.

Figure 1:
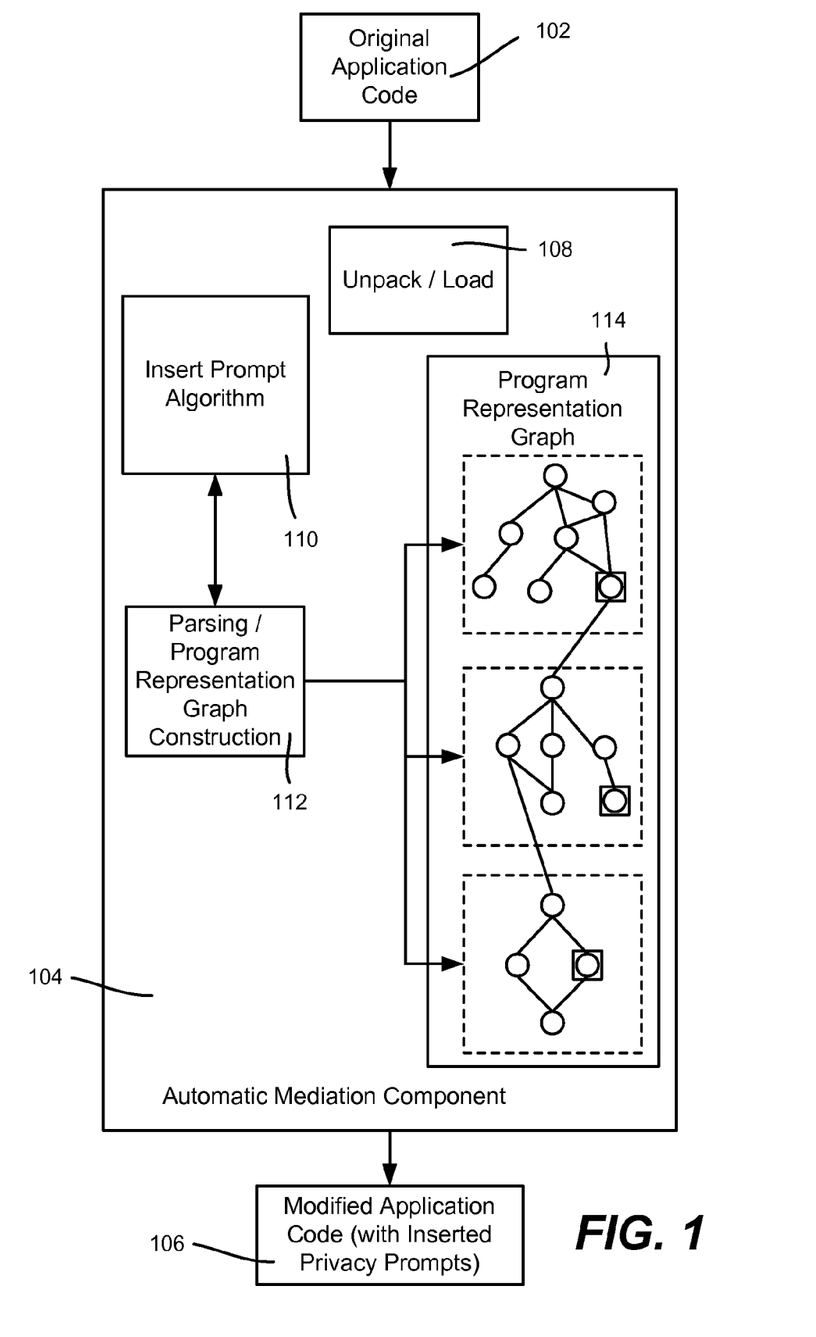
FIG. 1 is a block diagram representing example components configured to protect an application program with proper opt-in consent prompts before sensitive resource access, according to one example implementation.

FIG. 1 shows a generalized block diagram in which original application code 102 is processed by an automatic mediation component 104 into modified application code 106 having one or more inserted privacy prompts. Note that it is possible that a given application is correctly written and thus does not need prompt insertion, in which event the automatic mediation component 104 may be used to verify (to a reasonably high confidence level) that the application does not violate privacy policy.

The automatic mediation component 104 may be implemented in any of various ways. For example, the automatic mediation component 104 may be part of a cloud service, implemented as a standalone application, and/or as part of a development tool or other program by which developers write, debug, evaluate code, and so on.

The automatic mediation component 104 is generally directed towards placing runtime consent dialogs within mobile application code 102, including automatic and correct prompt placement, that is, at least a substantial amount of the time. To this end, a process/algorithm described herein automatically finds missing prompts and inserts (or otherwise proposes) a valid prompt placement.

Figure 2:
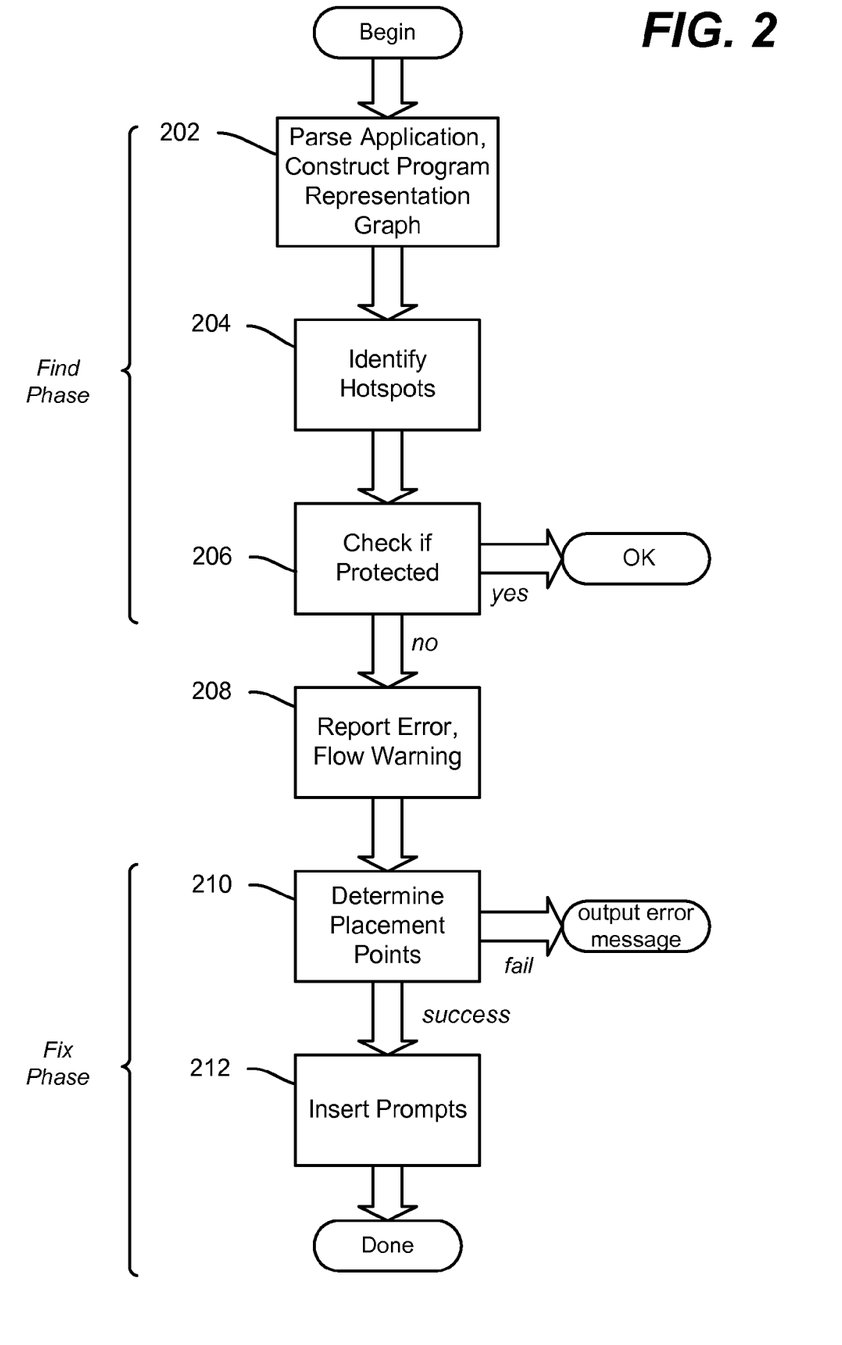
FIG. 2 is a pipeline/flow diagram representing how an application program may be protected with proper opt-in consent prompts, according to one example implementation.

As described herein, the application code 102 is unpacked and loaded. As generally represented in FIG. 2, a two-phase static analysis algorithm 110 is used for correct prompt placement resource access, including a finding phase that detects missing and incorrectly behaving resource access prompts, and a fixing phase that essentially inserts the prompts at appropriate points in the code.

In static analysis, the program source may be represented in the form of a graph, to abstract away many unnecessary features of the original source- or byte code representation. To this end, a parsing/program representation graph construction component 112 (which may be incorporated into the algorithm 110) constructs a program representation graph 114. Note that the program representation graph 114 in FIG. 1 represents various procedures (indicated by dashed lines), illustrating intra-procedural calls and inter-procedural calls between nodes, with calls represented by the edges between nodes.

Because a goal is to reason about prompts "guarding" resource access points, a control flow graph-like representation may be used. Further, because prompts and resource accesses have the form of method calls, it is convenient to augment the traditional notion of basic blocks to "break" at call sites. In this way, prompts can be inserted prior to any call, effectively splitting an edge.

The representations thus include intra-procedural calls and inter-procedural calls, that is, the graph is able to handle prompts that are located outside of the method in which the resource access takes place. This is particularly needed with applications in which methods generally tend to be small, e.g., .NET applications.

FIG. 2 represents various concepts in a pipeline/flow diagram, including block 202 which represents parsing the application and constructing the program representation graph; note that the graphs herein are simplified, as an actual program representation graph may contain on the order of thousands of nodes. Block 204 is directed towards identifying hotspots in the program representation graph, namely those nodes that call an API or the like known to access a resource for which an opt-in prompt is supposed to be provided to the user; (for example, the location access API exposed to applications may be through the GeoCoordinateWatcher class in the System:Device:Location namespace in the Windows® Phone operating system). For purposes of illustration, in FIG. 1 the nodes (circles) in the graph 114 that are surrounded by a square are example hotspots.

When the hotspots are identified, block 206 represents checking whether they are each properly protected as generally described below. If so, the application is verified as OK, and no prompts need to be placed into the code.

Otherwise, block 208 represents reporting an error or the like. This report (if used) may be sent to the application developer or used for any other purpose.

Block 210 determines the placement point or points, and block 212 inserts an appropriate prompt at each placement point. In the event of a failure, an error message may be output.

Figure 3:
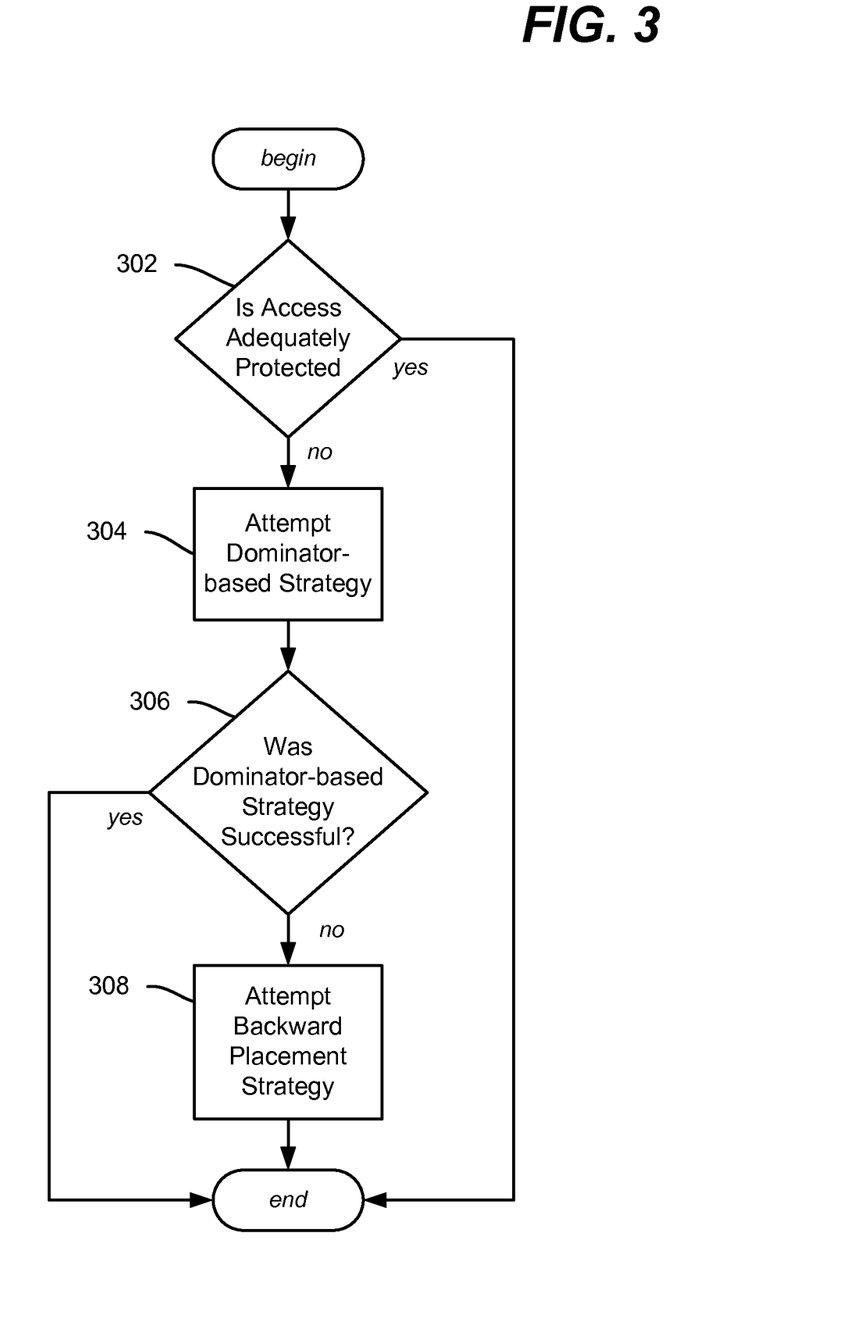
FIG. 3 is a flow diagram representing example steps for determining whether an application is properly protected with opt-in consent prompts, and if not, for protecting the application, according to one example implementation.

FIG. 3 summarizes a general flow of an analysis, in which for a given resource access, that is, a hotspot, step 302 represents evaluating whether access to that resource is adequately protected; if so, no prompt needs to be inserted. If not, as part of a two-pronged approach described herein, a dominator-based approach is attempted at step 304 with respect to prompt insertion. If successful as evaluated by step 306, the process ends for this prompt, otherwise a backward placement strategy is attempted at step 308.

In general, the dominator approach attempts to find a dominator node before which a prompt is allowed to be placed; more formally, node d∈N dominates node n∈N if every path from $N_{entry} \rightarrow n$ passes through d. Note that as described below, in one implementation, a prompt is not allowed to be placed in background processes (which cannot prompt) or in libraries (the coding of which is not touched).

The dominator-based strategy is attempted first, as it is fast and inserts fewer nodes than does the backward placement strategy. However, the dominator approach does not always work, as represented in the program representation graph 440 of FIG. 4A and the corresponding dominator tree 442 of FIG. 4B.

Figure 4A:
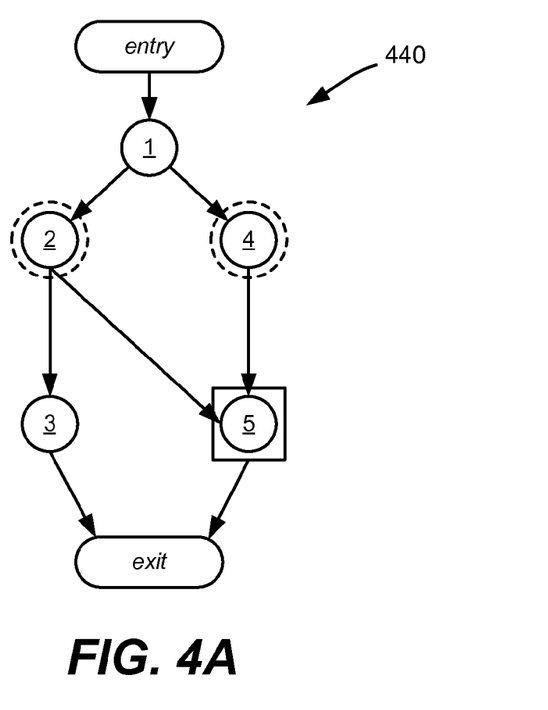
FIGS. 4A and 4B comprise a program representation graph and a dominator tree corresponding to the flow graph, respectively, which may be processed to determine where to protect an application with opt-in consent prompts, according to one example implementation.
Figure 4B:
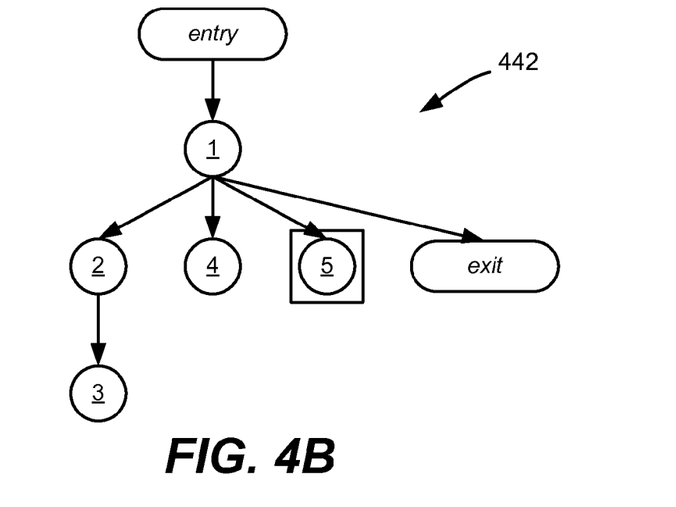

By way of example, consider that node 5 is part of a library and is missing an opt-in prompt. Thus, the dominator strategy starts at node 5 and walks up the dominator tree 442 of FIG. 4A, where it gets to node 1. The dominator strategy is based upon the dominator tree 442, which shows that node 1 is a dominator node as every path from the entry point is through node 1, including the paths to node 5.

However, placing a prompt before node 1 is wasteful because a path through node 1 does not always go to node 5. As referred to herein, node 1 is not an anticipating node because the path through node 1 is not necessarily to the hotspot; in contrast, node 4 is referred to as an anticipating node because the path through node 4 is eventually to the hotspot (node 5).

However, node 4 is not a dominator node, and placing a prompt before node 4 alone will not protect node 5 from the path from node 2 to node 5. Thus, a valid placement point is not found via the dominator-based strategy, whereby the backward placement strategy is used.

The backward placement strategy goes backwards in the graph from node 5, and ensures that a prompt is placed on every path to the hotspot. Thus, the backward placement strategy places a prompt before node 4 (represented by the dashed circle), as it is an anticipating node, and also places a prompt before node 2. Note that node 2 is not an anticipating node, but is less wasteful in terms of unnecessarily prompting the user than placing a prompt before node 1. The dominator and backward placement strategies are further described below.

Example Algorithm

Turning to additional details of one example algorithm, note that automatic prompt placement is not a trivial task. For example, multiple prompts on a given execution path for access to a resource need to be avoided. This is not trivial; indeed, consider the following code:

```
if(P) l1 = getLocation( );
l2 = getLocation( );
```

As can be seen, two prompts may be provided. There are two location access points and different ways to avoid duplicate prompts. One is to introduce a Boolean flag to keep track of whether the location has been prompted for already:

```
flag = true;
if (P) {
    prompt( );
    flag = true;
    l1 = getLocation( );
}
if(!flag){
    prompt( );
    l2 = getLocation( );
}
```

A disadvantage of this approach is that it requires introducing extra runtime instrumentation to perform this bookkeeping. A fully static approach involves rewriting the original code by "pulling" the second prompt into the if:

```
if (P) {
    prompt( );
    l1 = getLocation( );
    l2 = getLocation( );
}else{
    prompt( );
    l2 = getLocation( );
}
```

This approach has an advantage of not having to introduce extra bookkeeping code. A disadvantage is replication of the existing code across the branches of the if statement, which leads to extra code growth.

There is also a challenge of placing a prompt within a loop. Placing the prompt before the loop is not valid if the loop never executes. Placing the prompt within the loop body will lead to execution on every iteration. However, a simple dynamic check ensures that the location prompt is not shown more than once (Table 1):

```
while(P){
    if(not-yet-prompted-for-location){
        prompt( );
    }
    l1 = getLocation( );
}
```

Another challenge is referred to herein as "sticky prompts," in which applications make user-granted permissions persistent and avoid duplicate prompts by saving the prompt status to the application's isolated storage. A challenge exists in recognizing existing "sticky" prompts in application code and in making inserted prompts sticky, as described below.

Another consideration is avoiding weaker prompts. Suppose there are two resources r1, r2 such that r2 is less sensitive than r1. If an application has already prompted the user for access to r1, it is supposed to avoid prompting the user for access to resource r2. For instance, if an application already has requested access to fine-grained location, there is no need to prompt for access to coarse-grained location. For example, in:

```
l1 = getFineLocation( );
l2 = getCoarseLocation( );
``` the proper placement of a prompt is just before the call to getFineLocation( ) There is no need for a second, weaker prompt.

Another aspect is directed towards minimizing prompting. Consider a related example, which differs from the above example in the order of the calls:

```
l1 = getCoarseLocation ( );
l2 = getFineLocation( );
```

One possibility to place location prompts is to place one before the coarse location call, and another before the fine-grained location call. However, this is excessive in this straight-line code; indeed, a single fine-grained prompts is sufficient before coarse location call.

Avoiding prompts in a background task is another consideration; e.g., Windows® Phone applications provide non-interactive background tasks, which are often used for polling remote servers and other tasks that do not require access to the user's screen beyond, perhaps, a live tile of the application.

Dialog boxes cannot be raised within background tasks in one or more implementations. To properly determine where prompts need to be located, the application program representation graph needs to be understood to determine what foreground code precedes the code within background tasks.

Prompts also may be avoided in libraries. As libraries are often shipped in the form of byte code and are updated separately from the rest of the applications, avoiding placing prompts in library code allows developers to examine prompt placement within their own code, and to alleviate the need to keep custom-modified versions of third-party libraries, which can make error reporting, debugging, and sharing libraries across applications a challenge.

As used herein, a resource access prompt placement problem may be defined as:

Let $P=\langle N, A, B, E, C, L \rangle$ be a tuple defined as:

N: set of enhanced basic blocks (e.g., blocks of straight line code without control flow or procedure calls) in the program comprising a sequence of instructions $N=n_1, n_2, \ldots n_k$. For simplicity, assume that graph G has unique entry and exit nodes $N_{entry}, N_{exit} \in N$.

$A \subset N$: set of resource access points;

$B \subset N$: set of blocks located within background tasks and (third-party) libraries; assume that $N_{entry}, N_{exit}$ are outside background tasks and libraries;

E: inter-procedural control flow edges;

C: inter-procedural call and return edges.

$L=\langle R, \sqsubseteq \rangle$: the lattice of access permissions.

This representation is an expanded inter-procedural control flow graph $G=\langle N, E \cup C \rangle$.

As used herein, a valid placement of resource access prompts may be defined as: placement $P \subset N$ is a valid placement for a prompt placement problem $P=\langle N, A, B, E, C, L \rangle$ if the following conditions hold for runtime executions of the application:

Safe: Access to resource $r \in R$ is preceded by a prompt check for r.

Visible: No prompt is located within a background task or a library.

Frugal: Prompt for $r \in R$ is not invoked unless it is followed by a call to get(r) or an exception occurs.

Not-Repetitive: Prompt for permission $p_2 \in P$ is not invoked if permissions for $p_1 \in P$ have already been granted and $p_1 \sqsubseteq p_2$.

In general, a missing prompt is needed at a particular point, for which the term "anticipating" may be used. By way of example, consider the code snippet below,

```
1.
2.  if(P){
3.      var l = getLocation( );
4.  } else {
5.      x++;
6.  }
```

Location access is anticipating before line 3, but it is not anticipating before the if on line 2, because of the else branch. Placing the prompt on line 1 leads to unnecessary prompting, violating the condition of being frugal.

A basic block $B \in N$ is referred to herein as r-anticipating if every path from B to $N_{exit}$ passes through a resource access of type r. With respect to prompts having different "strength," which may result in potentially unnecessary prompts, the notion of being anticipating may be defined with respect to a particular kind of resource, (rather than globally), taking into account the lattice of resource access permissions.

Figure 5:
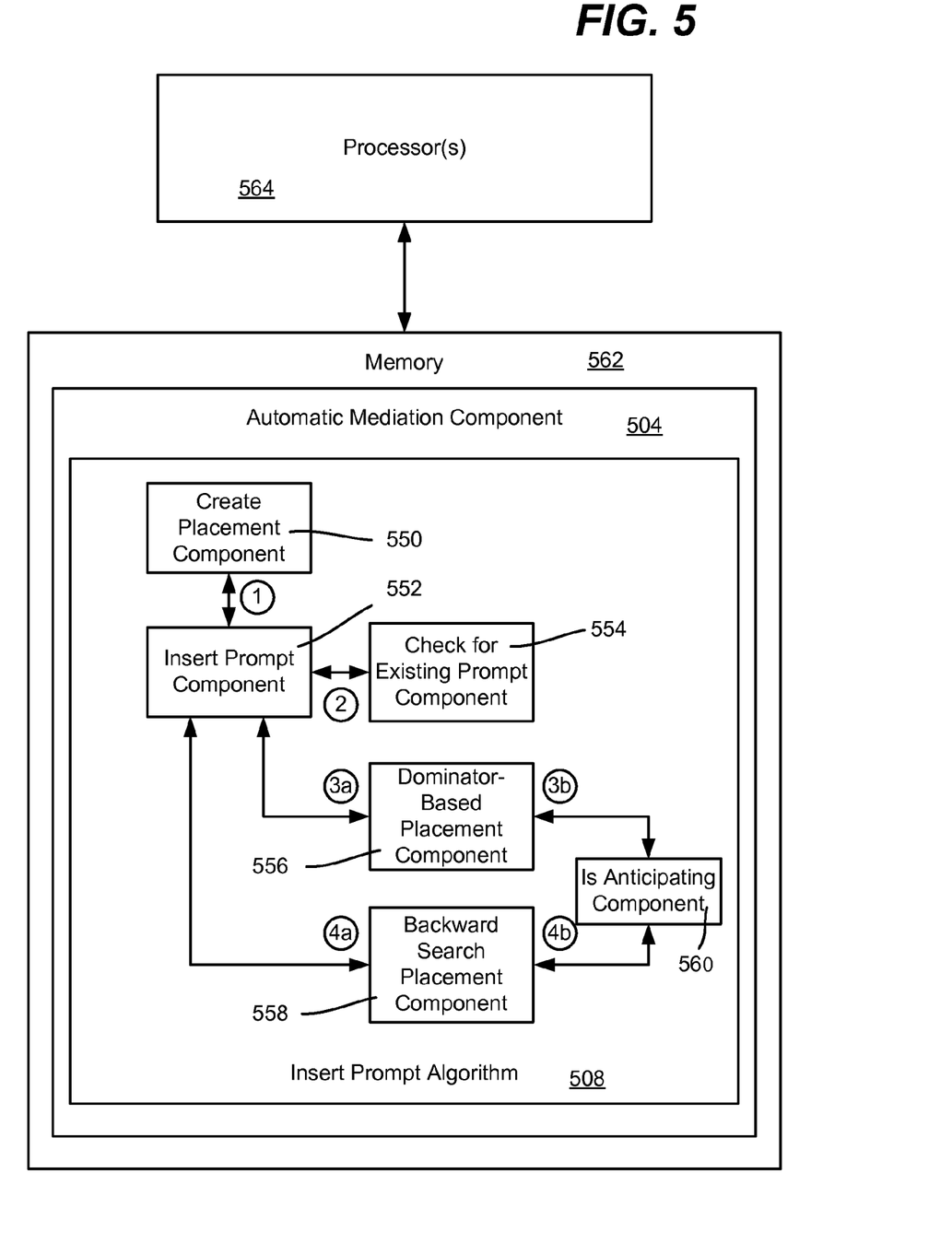
FIG. 5 is a block diagram representing example components of an algorithm used for statically analyzing program code with respect to proper use of opt-in consent prompts, according to one example implementation.

FIG. 5 provides additional details of one suitable algorithm of an automatic mediation component 504 exemplified herein, comprising an "Insert Prompt" algorithm 508. A create placement component 550 (e.g., a called function) checks whether there is indeed a valid placement for resource accesses. Once this is ensured, one or more other components/called functions proceed to modify the underlying graph as described herein, including an insert prompt component 552, a check for existing prompt component 554, a dominator-based placement component 556, a backward search placement component 558 and an is anticipating component 560. These components are shown in memory 562 coupled to one or more processors 564, and are described in further detail below.

Using the notion of dominators in the graph can abstract away unnecessary details. Recall that node $d \in N$ dominates node $n \in N$ if every path from $N_{entry} \rightarrow n$ passes through d. A dominator relationship induces a dominator tree over the set of nodes N. An example of such a dominator tree 442 for a graph 440 in FIG. 4A is shown in FIG. 4B.

By this definition, dominator-based placement is a straightforward way to "block" access to a particular resource access. Because a placement as close as possible to the access point is desired, the immediate dominator of the resource access node is preferred. By definition, there is a safe placement, because $\forall a \in A$, every path from $N_{entry} \rightarrow a$ passes through idom(a), the immediate dominator of a.

Note that this approach suffers from two problems, including that background and library nodes can invalidate immediate dominator-based placement. To deal with the issue of visibility, the prompts may be shifted up in the dominator tree. Further, immediate dominator-based placement can violate the frugality condition; indeed, consider the location access at line 3 in the above code snippet (var l=getLocation( );). Its immediate dominator is the if(P) check node at line 2. However, this node is not location-anticipating, because the else branch is not accessing the location.

A viable approach is therefore to start at the resource access node and walk up the dominator tree until a node is encountered that is not in the background or a library. This is guaranteed to encounter such a node, because eventually the walk will encounter $N_{entry}$, which is a foreground, non-library node by definition.

Consider that for the graph/tree in FIGS. 4A and 4B, node 5 is a library node that is also a hotspot, (as denoted by the square around the circular labeled node). Nodes 1 and $N_{entry}$ are in the cover for node 5. Node 1 is the immediate cover of Node 5. The approach, therefore, will choose node 1 for a prompt protecting node 5, however this placement will violate the frugality condition.

An alternative strategy (that is, the backward placement strategy) is to recognize that sometimes dominator-based placement goes "too far" in the graph to become unnecessary—and is thus not frugal. The predecessors of the resource access node may be explored to find an individual separate place for a prompt for each of them. For node 5 in FIG. 4A, both predecessor Nodes 2 and 4 present valid placement opportunities, which are also frugal. As long as the strategy is able to find such opportunities by performing a backward search within the graph starting at resource access nodes, there is a valid placement. However, this approach may not scale particularly well, as it involves an exponential graph search. While this is true in theory, in practice a valid placement is often found within several nodes, and thus this strategy is generally workable. Note also that more prompts will be created compared to the dominator-based approach, e.g., (two nodes instead of one for the graph in FIG. 4A), which may increase the size of the rewritten application.

Unlike dominator-based placement, there is a possibility of passing through prompt placement nodes multiple times at runtime. To see this, consider adding a backward edge from note 3→1 in FIG. 4A. This edge does not affect the dominator tree or dominator-based placement. If prompts are placed at Nodes 2 and 4 for resource access at Node 5, there is a possibility of encountering the prompt at Node 2 multiple times going through the loop 1→2→3. This kind of double-prompting violates the Not-Repetitive condition. One way to address this is to record user consent in the application's isolated storage (e.g., as a sticky prompt) for both the current runtime session and future application invocations.

To summarize one placement approach:
1. For every r∈R and every node n∈N, compute its r-anticipating value $A_r(n)$.
2. Merge values by meeting them in the lattice R for all resource types:

$$A(n) = \bigwedge_{r \in R} A_r(n)$$

3. For every resource access a of type r, use a backward search to find if it is adequately covered by existing prompts of type r' such that r' ⊑ r.
4. If not, proceed to insert a prompt of type A(n) using either a dominator-based or a backward placement strategy.

Anticipating values can be calculated using a simple dataflow computation. A formulation of this analysis is shown below:

| Semi-lattice | L | power set of R | |
|---|---|---|---|
| Top | T | ∅ | |
| Initial value | init(n) | ∅ | |
| Transfer function | TF(n) | add r to set | if n is an access for r ∈ R |
| | | identity | otherwise |
| Meet operator | ∧ (x, y) | union x ∪ y | |
| Direction | | backward | |

An advantage of such a formulation is that it runs in linear time, given a lattice of finite height (and size), and that most compiler frameworks already provide a dataflow framework into which this kind of analysis can be "dropped." There is some flexibility when it comes to the last step, e.g., by choosing to use a dominator-based or a backward placement strategy. In one implementation the dominator strategy is tried first to see if it yields a valid placement and, failing that, the backward strategy is used.

This hybrid approach is shown in function INSERTPROMPT in the following code; (Note that if placement is successful, the outcome is stored in the Placement ⊂ N set.):

```
1:   function INSERTPROMPT(G, a, ant, idom)
2:     if ¬ HasPrompt(G, a.Type, a) then
3:       // Try dominator-based first
4:       Placement ← ∅
5:       success ← InsertPrompt-D(G, a, ant, idom)
6:       if ¬ success then
7:         // Try backward placement next
8:         Placement ← ∅
9:         InsertPrompt-B(G, a, ant)
10:      end if
11:      end if
12:    end function
13:
14:    //Dominator-based placement
15:    function INSERTPROMPT-D(G, a, ant, idom)
16:      n ← a
17:      while n ≠ N_entry do
18:        if IsAnticipating(n, a.Type, ant) ∧
19:          a ∉ G.Background ∧ a ∉ G.Libraries
20:        then
21:          Placement ← Placement ∪ {a}
22:          return true
23:        else
24:          n ← idom(n)    ▷ Proceed to the immediate dominator
25:        end if
26:      end while
27:      return false
28:    end function
29:
30:    // Backward search placement
31:    function INSERTPROMPT-B(G, a, ant)
32:      Occurs-check(a)    ▷ Prevent infinite recursion
33:      if ¬ IsReachable(a) ∨ (IsAnticipating(a, a.Type, ant)
34:        ∧ a ∉ G.Background ∧ a ∉ G.Libraries)
35:      then
36:        Placement ← Placement ∪ {a}
37:        return true
38:      else
39:        for all p ∈ G.predecessors(a) do    ▷ Predecessors
40:          success ← InsertPrompt-B(G, p, ant)
41:          if ¬ success then
42:            return false    ▷ One of the predecessors failed
43:          end if
44:        end for
45:        return true    ▷ All predecessors succeeded
46:      end if
47:    end function
48:
49:    //Checks for existing prompts
50:    function HASPROMPT(G, r, a)
51:      if a ∈ G.Accesses then
52:        r' ← a.Type
53:        adequate (r' ⊑ r)
54:        if adequate then
55:          return true    ▷ Check if adequately protected
56:        end if
57:      end if
58:      for all p ∈ G.predecessors(a) do Explore all
                                          // predecessors in turn
59:        success HasPrompt-B(G, r, p)
60:        if ¬ success then
61:          return false    ▷ One of the predecessors failed
62:        end if
63:      end for
64:      return true    ▷ All predecessors succeeded
65:    end function
66:
67:    function ISANTICIPATING (n, r, ant)
68:      r' ← ant(n)    ▷ Computed prompt type at n
69:      return r' ⊑ r
70:    end function
```

INSERTPROMPT-B has an occurs-check on line 32 to avoid the possibility of infinite recursion for graphs with loops, which are encountered in the process of backward exploration. If the current node is not reachable from non-library code as indicated by IsReachable, true is returned.

In one implementation, the placement creation algorithm that pulls the other functions together to create a placement is shown below:

```
1:   function CREATEPLACEMENT (G, ant, idom)
2:     for all a ∈ G.Accesses do
3:       success ← InsertPrompt(G, a, ant, idom)
```

-continued

```
4:      if ¬ success then
5:          return false
6:      else
7:          for all p ∈ Placement do
8:              Prompts ← Prompts ∪ <p, ant(a)>
9:          end for
10:     end if
11:  end for
12:
13:  // All clear: proceed with the placement
14:  for all <n, t> ∈ Prompts do
15:      InsertAtNode(n, t)
16:  end for
17:  return true
18: end function
```

The algorithm first checks whether there is indeed a valid placement for all resource accesses. Once this is ensured, the underlying graph is modified by inserting prompts at appropriate places.

One current implementation of the static analysis described herein involves dealing with a variety of practical details, some of which are fairly common in byte code-based static analysis tools, whereas others are more specific to Windows® Phone applications written in .NET. Such applications are distributed as XAP files, which are archives comprising code in the form of byte code DLLs, resources such as images and XAML, and the application manifest, specifying requested capabilities, and so forth.

As described herein, one or more implementations build a graph on which to perform an analysis. Intra-procedurally, the system parses the .NET byte code to construct basic blocks; they are terminated at method calls to simplify analysis. For program representation graph construction, a known class hierarchy analysis may be used to resolve virtual calls within the program. The dominator tree may be built as part of graph construction.

In many cases, the resulting graphs have enough precision for the analysis. However, imprecision usually does not stem from the underlying program representation graph construction approach, which could be alleviated through pointer analysis, but in challenges specific to complex applications. For example, the code below illustrates some complications posed by event handlers.

```
static void Main(string[ ] args) {
    AppDomain.CurrentDomain.ProcessExit +=
                  new EventHandler(OnProcessExit);
}
// library code
static void OnProcessExit(object sender, EventArgs e) {
    // location access
    var watcher =
       new System.Device.Location.GeoCoordinateWatcher( );
    var pos = watcher.Position;
}
```

By default, method OnProcessExit does not have any predecessors in the program representation graph. At runtime, it may be called from a variety of places, which is not easy to model as part of program representation graph construction. However, it may not be called before the event handler is registered in method Main. One solution is to augment the program representation graph construction code to create an invocation edge from the registration site to OnProcessExit. The analysis is then able to place the prompt right after the registration in method Main, which makes a significant difference in finding successful placements.

Another similar form of delayed execution in some applications is actions (System.Action) and its asynchronous action System.AsyncCallback, which are basically wrappers around delegates registered for later execution. Actions may be dealt with similar to event handlers.

XAML: A particular difficulty for analysis stems from the use of declarative UIs specified in XAML, an XML-like language that combines an easy-to-read UI specification with "hooks" to code. XAML is compiled into resources that are embedded in application DLLs. When a method InitializeComponent( ) is called on the class specified in XAML, it proceeds to register events that are specified declaratively, as shown in a XAML snippet below:

```
1  <phone:PhoneApplicationPage.ApplicationBar>
2    <shell:ApplicationBar IsVisible="True">
3      <shell:ApplicationBar.MenuItems>
4        <shell:ApplicationBarMenuItem Text="Settings"
5          Click="SettingsClick" />
6      </shell:ApplicationBar.MenuItems>
7    </shell:ApplicationBar>
8  </phone:PhoneApplicationPage.ApplicationBar>
```

Event handler SettingsClick needs to be properly registered so that it can later be invoked.

As described above, one approach resorts to backward placement when there is a resource access that is otherwise unprotected and the dominator-based strategy fails. However, there is a possibility of exponential path explosion, which is possible given the size of the graphs, on the order to thousands to tens of thousands of nodes. The strategy thus needs to be able to perform backward exploration efficiently. One approach relies on first building a spanning tree rooted at the access node, computed using a depth-first search. The following gives an example of such a tree:

```
[SomaAd..ctor( ) @ 0134) bg // resource access
   [SomaAd..ctor( ) @ 0120) bg
      [SomaAd..ctor( ) @ 0118) bg
         [SomaAd..ctor( ) @ 0000) bg
            [SomaAdViewer.StartAds( ) @ 00a6) bg
               [SomaAdViewer.StartAds( ) @ 009e) bg
                  [SomaAdViewer.StartAds( ) @ 0000) bg
                     [CollectHome.g_AdFailed(object, ...) @ 00f7) fg
                        [CollectHome.g_AdFailed(object, ...) @ 0052) fg
                           [CollectHome.g_AdFailed(object, ...) @ 000a) fg
                              [CollectHome.g_AdFailed(object, ...) @ 0000) fg
                              [CollectHome.g_AdFailed(object, ...) @ 0040) fg
                                 [CollectHome.g_AdFailed(object, ...) @ 0030) fg
                                    [CollectHome.g_AdFailed(object, ...) @ 0008
                                    fg)
                           [CollectHome.g_AdFailed(object, ...) @ 004a) fg
                              [CollectHome.g_AdFailed(object, ...) @ 00df) fg
                           [CollectHome.g_AdFailed(object, ...) @ 006c) fg
                              [CollectHome.g_AdFailed(object, ...) @ 0066) fg
```

The tree allows classifying underlying graph edges as ether forward, backward, or cross edges. Further analysis is performed on the tree as a series of downward passes, implemented as recursive procedures, starting at the resource access and exploring the predecessors. To avoid stack overflow issues stemming from deep trees, once the tree has been constructed, the size is ensured to be below a fixed threshold (e.g., set to 250). The process also pre-computes which nodes of G are reachable from non-library code. In summary, the following four steps are performed:

1. Build: Build a backward spanning tree rooted at the resource access.
2. Traverse: Traverse the tree recursively top down, computing initial values for all nodes. For each non-root, non-library non-background node, declare it as a valid placement point and return true. For all unreachable nodes, return true. This is because there is in fact dead code, especially, in libraries. Its presence should not prevent placement. For other nodes, if all their predecessors return true, propagate it up.
3. Patch-up: Traverse the tree considering cross edges originating at the current node. Logically AND values from destinations of cross-edges with the current node's value.
4. Collect: Traverse the tree propagating (newly) true values up to the root: if all children now return true, return true.

The advantage of this approach is its simplicity and guaranteed computational complexity. It starts with all spanning tree nodes as unvisited and then performs three recursive traversals of the tree. In one implementation, the same spanning tree may be used for the prompt checking and placement analysis stages. This approach is linear in the size of the graph, and is relatively fast, as there are usually at most hundreds of nodes reachable from any resource access.

Runtime considerations include attempting to ensure that double-prompting is not induced. To do so, a "sticky" app global setting value may be maintained in the application's isolated storage, as illustrated by the following example for the fine-grained GPS location resource type:

```
1   var setting = IsolatedStorageSettings.
2      get_ApplicationSettings( ).
3      get_Item("UserLocationSettings");
4   if (setting == null){
5      int result = MessageBox.Show(
6         "Is it OK to access your fine-grained GPS location?",
7         "Allow" + Assembly.GetExecutingAssembly( ).FullName( ) +
8            " to access and use your location.",
9         1);
10     {
11        settings.set_Item("UserLocationSettings",
12                        (result == 1) ? "Y" : "N");
13     }
14  }else{
15     if(setting.ToString( ).Equals("Y")){
16        // proceed with the prompt
17     }
18  }
```

Note that to comply with privacy guidelines, the text of the privacy policy, or a link to it, is to be shown as part of the prompt. If this policy is specified or referenced in the application manifest, a link to it may be embedded automatically.

Example Operating Environment

Figure 6:
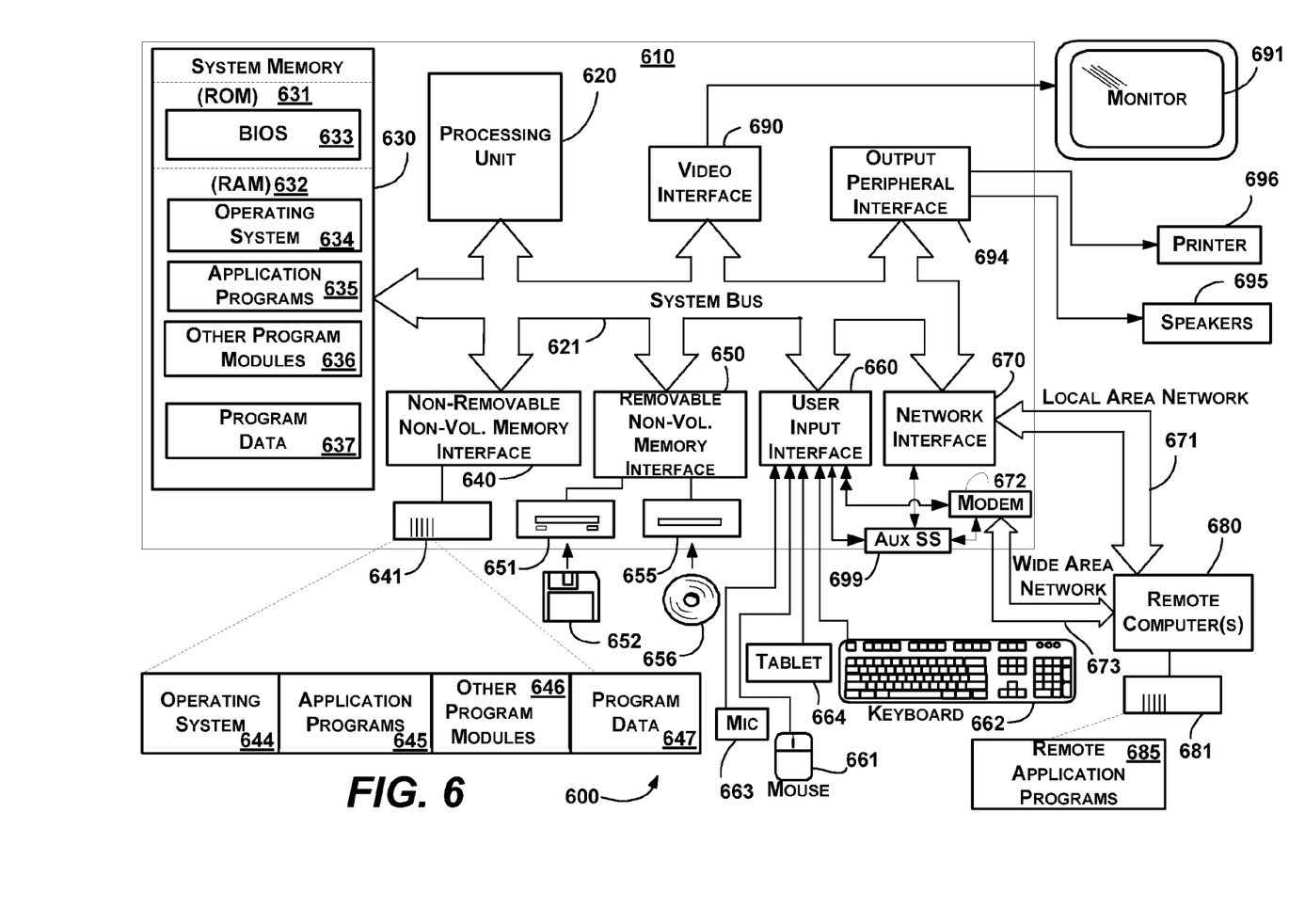
FIG. 6 is a block diagram representing an exemplary non-limiting computing environment and system into which one or more aspects of various embodiments described herein can be implemented.

FIG. 6 illustrates an example of a suitable computing and networking environment 600 into which the examples and implementations of any of FIGS. 1-5 may be implemented, for example. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the example operating environment 600.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an example system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, solid-state device memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the example operating environment include, but are not limited to, magnetic tape cassettes, solid-state device memory cards, digital versatile disks, digital video tape, solid-state RAM, solid-state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are examples and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method, comprising:
   automatically processing application program code including locating one or more places in the application program code that do not comply with consent prompting policy, including statically analyzing the application program code including determining where sensitive data is able to be accessed during runtime without a consent prompt being shown to a user prior to the sensitive data being accessed, the method further comprising:
   constructing a program representation graph representing both calls in the application program code and logic inside individual procedures or methods, by a program graph representation construction component;
   processing the program representation graph, by a program representation graph processing component, including determining whether the application program code fails to provide a runtime consent dialog prior to a potential runtime access of a privacy-sensitive resource;

determining, by one or more placement components, one or more placement points to insert prompting code corresponding to a consent dialog into the application program code if the application program code fails to provide the runtime consent dialog prior to the potential runtime access of the privacy-sensitive resource, wherein the one or more placement components includes a dominator-based placement component and a backward search placement component;

constructing a dominator tree, by a dominator tree construction component;

processing the dominator tree, by the dominator-based placement component, to attempt to determine the one or more placement points; and, on determining the dominator-based placement component fails to determine the one or more placement points, determining the one or more placement points by the backward search placement component, wherein the dominator-based placement component and the backward search placement component do not choose a placement point within code of a library.

2. The method of claim 1 further comprising:
inserting the prompting code at the one or more placement points to prevent the sensitive data from being accessed during the runtime without the consent prompt being shown to the user.

3. The method of claim 2 further comprising:
using isolated storage of the application program code to avoid duplicating showing of the consent prompt.

4. The method of claim 3 wherein using isolated storage of the application program code to avoid duplicating showing of the consent prompt further comprises:
saving a prompt status to the isolated storage of the application program code to make user-granted permissions persistent.

5. The method of claim 4 further comprising:
recording user consent in the isolated storage of the application program code for both a current runtime session and future application invocations.

6. The method of claim 1 wherein the application program code is processed by an automatic mediation component, and wherein the automatic mediation component is part of a cloud service.

7. The method of claim 1 further comprising:
determining that the one or more placement points does not correspond to a background process, wherein the dominator-based placement component and the backward search placement component do not choose a placement point within code of the background process.

8. The method of claim 1 wherein a user consent is recorded in an isolated storage of the application program code for both a current runtime session and future application invocations.

9. The method of claim 1 wherein the application program code is mobile application program code, and further comprising:
placing the runtime consent dialog within the mobile application program code.

10. The method of claim 1 wherein determining the one or more placement points by the backward search placement component further comprises:
performing a backward search going backwards from a given node in the program representation graph to ensure that a prompt is placed on every path to the given node.

11. The method of claim 1 wherein processing the dominator tree, by the dominator-based placement component, to attempt to determine the one or more placement points further comprises:
walking the dominator tree to determine whether a valid place to insert the prompting code exists, wherein walking the dominator tree to determine whether a valid place to insert the prompting code exists further comprises:
determining whether a node in the dominator tree is an anticipating node that needs a prompt placement of a prompt later in the program representation graph.

12. In a computing environment, a system comprising:
a program graph representation construction component constructing a program representation graph representing both calls in application program code and logic inside individual procedures or methods;

a program representation graph processing component processing the program representation graph including determining whether the application program code fails to provide a runtime consent dialog prior to a potential runtime access of a privacy-sensitive resource;

one or more placement components determining one or more placement points to insert prompting code corresponding to a consent dialog into the application program code if the application program code fails to provide the runtime consent dialog prior to the potential runtime access of the privacy-sensitive resource; and a dominator tree construction component that constructs a dominator tree, wherein the one or more placement components includes a dominator-based placement component and a backward search placement component, the dominator-based placement component attempting to determine the one or more placement points based upon processing of the dominator tree, and, if the attempt fails, the backward search placement component determining the one or more placement points, wherein the dominator-based placement component and the backward search placement component do not choose a placement point within code of a library.

13. The system of claim 12 wherein the dominator-based placement component determines the one or more placement points based upon walking of the dominator tree.

14. The system of claim 12 further comprising:
an insert prompt component, wherein the insert prompt component inserts the prompting code at the one or more placement points to prevent the sensitive data from being accessed during the runtime without the consent prompt being shown to the user.

15. The system of claim 12 further comprising:
an isolated storage of the application program code, the isolated storage of the application program code is used to avoid duplicating showing of the consent prompt.

16. The system of claim 15 further comprising:
the backward search placement component performs a backward search using the program representation graph to determine the placement points to insert the prompting code.

17. The system of claim 15, wherein the dominator-based placement component and the backward search placement component do not choose a placement point within code of a background process.

18. One or more computer-readable storage devices having computer-executable instructions, which are executed to perform steps, comprising:
- constructing a program representation graph, by a program graph representation construction component, including representing at least part of application program code, the program representation graph representing both calls in the application program code and logic inside individual procedures or methods;
- constructing a dominator tree corresponding to the program representation graph, by a dominator tree construction component;
- analyzing the application program code in a static analysis operation by processing the program representation graph, by a program representation graph processing component, including determining whether the application program code fails to provide a runtime consent dialog prior to a potential runtime access of a privacy-sensitive resource, and wherein the program representation graph processing component further determines whether access to the privacy-sensitive resource is protected by the runtime consent dialog at potential access points;
- determining one or more placement points to insert prompting code corresponding to the runtime consent dialog into the application program code, by one or more placement components, if the application program code fails to provide the runtime consent dialog prior to the potential runtime access of the privacy-sensitive resource, wherein the one or more placement components includes a dominator-based placement component and a backward search placement component;
- processing the dominator tree, by the dominator-based placement component, to attempt to determine the one or more placement points, wherein a dominator-based strategy is attempted to determine whether consent dialog code is able to be inserted into the application program code at a place corresponding to an anticipating node that protects a potential access point; and
- on determining the dominator-based placement component fails to determine the one or more placement points, determining the one or more placement points by the backward search placement component, wherein a backward search strategy is performed based upon the program representation graph to find one or more places in the application program code where the consent dialog code is able to be inserted to protect the potential access point, wherein the dominator-based placement component and the backward search placement component do not choose a placement point within code of a library.

19. The one or more computer-readable storage devices of claim 18 having further computer-executable instructions comprising:
- modifying the application program code, including automatically inserting the consent dialog code to protect potential access points that was determined to have been not protected.

20. The one or more computer-readable storage devices of claim 18 wherein automatically inserting the consent dialog code comprises:
- using isolated storage of the application program code to avoid duplicating output of the runtime consent dialog.

\* \* \* \* \*